United States Patent
Sarver et al.

(10) Patent No.: US 7,458,199 B2
(45) Date of Patent: *__Dec. 2, 2008__

(54) MOWER ATTACHMENT MECHANISM

(75) Inventors: Corey E. Sarver, Oregon, IL (US);
Brian C. Fagan, Oregon, IL (US); Paul Shenberger, Dubuque, IA (US)

(73) Assignee: WEC Company, Oregon, IL (US)

( * ) Notice: Subject to any disclaimer, the term of this patent is extended or adjusted under 35 U.S.C. 154(b) by 109 days.

This patent is subject to a terminal disclaimer.

(21) Appl. No.: 11/403,653

(22) Filed: Apr. 13, 2006

(65) Prior Publication Data

US 2006/0179809 A1    Aug. 17, 2006

Related U.S. Application Data

(63) Continuation of application No. 10/873,322, filed on Jun. 22, 2004, now Pat. No. 7,062,898.

(51) Int. Cl.
*A01D 67/00* (2006.01)
(52) U.S. Cl. .................... 56/320.1; 56/320.2
(58) Field of Classification Search ............ 56/6, 56/14.7, 16.7, 17.3, 320.1, 320.2, DIG. 8
See application file for complete search history.

(56) References Cited

U.S. PATENT DOCUMENTS

| | | | |
|---|---|---|---|
| 4,226,074 A | 10/1980 | Mullet et al. |
| 4,487,007 A | 12/1984 | Mullet et al. |
| 4,497,160 A | 2/1985 | Mullet et al. |
| 4,916,887 A | 4/1990 | Mullet et al. |
| 4,958,484 A | 9/1990 | Busboom |
| 4,991,382 A | 2/1991 | Scag |
| 5,090,512 A | 2/1992 | Mull et al. |
| 5,205,112 A | 4/1993 | Tiyiotson et al. |
| 5,210,998 A | 5/1993 | Hojo et al. |
| 5,212,938 A | 5/1993 | Zenner et al. |
| 5,267,429 A | 12/1993 | Kettler et al. |
| 5,305,589 A | 4/1994 | Rodriguez et al. |
| 5,355,664 A | 10/1994 | Zenner |
| 5,457,947 A | 10/1995 | Samejima et al. |
| 5,465,564 A | 11/1995 | Koehn et al. |
| 5,483,790 A | 1/1996 | Kuhn et al. |
| 5,488,821 A | 2/1996 | McCunn et al. |
| 5,528,886 A | 6/1996 | Esau |
| 5,609,011 A | 3/1997 | Kuhn et al. |

(Continued)

OTHER PUBLICATIONS

Landpride Riding Mowers, Commercial and Residential, Landpride Catalog Mar. 2002.

(Continued)

*Primary Examiner*—Thomas B Will
*Assistant Examiner*—Alicia Torres
(74) *Attorney, Agent, or Firm*—Foley & Lardner LLP

(57) ABSTRACT

A mower attachment comprising an attachment housing and a plurality of blade assemblies. The attachment housing includes an upper surface and front and rear baffles extending downwardly from the upper surface, the front and rear baffles shaped to define a plurality of blade chambers therebetween. The plurality of blade assemblies are positioned within the plurality of blade chambers. A leading plate is operatively connected to the housing and extends away from the plurality of blade chambers. The leading plate includes a plurality of apertures on a top side thereof.

29 Claims, 5 Drawing Sheets

U.S. PATENT DOCUMENTS

| | | | |
|---|---|---|---|
| 5,628,171 A | 5/1997 | Stewart et al. |
| 5,685,134 A | 11/1997 | Thornburg |
| 5,765,346 A | 6/1998 | Benter et al. |
| 5,826,416 A | 10/1998 | Sugden et al. |
| 5,845,475 A | 12/1998 | Busboom et al. |
| 5,890,354 A | 4/1999 | Bednar |
| 5,987,863 A | 11/1999 | Busboom et al. |
| 6,105,349 A | 8/2000 | Busboom et al. |
| 6,192,666 B1 | 2/2001 | Sugden et al. |
| 6,347,503 B1 | 2/2002 | Esau et al. |
| 6,434,917 B1 | 8/2002 | Bartel |
| 6,557,331 B2 | 5/2003 | Busboom et al. |

OTHER PUBLICATIONS

EXmark Sales Catalog, exmark 2002.

Scag 2003 Commercial Mower Catalog. Scag Power Equipment 2003.

MOWER ATTACHMENT MECHANISM

RELATED APPLICATIONS

The present application is a continuing application filed claiming priority to U.S. application Ser. No. 10/873,322, the entirety of which is hereby incorporated by reference.

FIELD OF THE INVENTION

The present invention relates generally to systems for cutting grass. More particularly, the present invention is directed to systems for cutting or mowing grass involving the use of a mower attachment including a plurality of blade assemblies.

BACKGROUND OF THE INVENTION

A wide variety of systems are conventionally known for cutting or mowing grass. One such system involves the use of a mower attachment including a plurality of blade assemblies. This removable attachment is connected to the front of a vehicle, such as a small tractor, which is used to push the attachment during the mowing process. Such a system includes a plurality of blade assemblies spaced apart from each other within a housing. During the cutting process, air flows underneath the housing while the cutting action is in progress. The air flow carries the grass clippings through a discharge chute which is typically located on one side of the attachment.

Although such mowing systems are widely used, conventional systems include a number of drawbacks. For example, the air flow through the attachment system during the mowing process is quite inefficient in that the air flow is inefficiently directed inside the housing resulting in some of the air flow "swirling around" the inside of the housing. This causes some of the grass clippings to not quickly and/or directly flow through the discharge chute. In some instances, a substantial percentage of the grass clippings will not flow out the discharge chute at all, instead simply collecting on the ground along the path of the mower. Alternatively, some of the grass clippings may collect on the inside of the housing, while others may even blow out through the front of the unit under certain circumstances. All of these actions cause serious distribution issues for the user, as the amount of time needed to distribute all of the grass clippings increases substantially due to this inefficient air flow.

It would therefore be desirable to develop a method for more efficiently directing the air flow through a mower attachment, such that grass clippings are efficiently directed out of the discharge chute with minimal misdirection.

SUMMARY OF THE INVENTION

It is therefore an object of the invention to provide an improved system for cutting grass, wherein air flow is more efficiently directed through the system than in conventional devices.

It is another object of the present invention to provide an improved system for cutting grass where a reduced number of grass clippings are misdirected after being cut.

In accordance with the above objects, there is provided a mower attachment comprising an attachment housing and a plurality of blade assemblies. The attachment housing includes an upper surface, as well as front and rear baffles extending downwardly therefrom to define a plurality of blade chambers. The plurality of blade assemblies are positioned within the plurality of blade chambers and are arranged to effectively cut or mow grass. A leading plate is operatively connected to the front of the housing extending away from the plurality of blade chambers. The leading plate includes a plurality of apertures on one side thereof. The plurality of apertures are arranged such that during the cutting process, air flows through the plurality of apertures to aid in the directing of grass clippings through the discharge chute.

The use of this "false front" on the mower attachment enhances the blade suction while at the same time providing structural integrity and better air flow, controlling "blow out" of the system. The "false front" also creates a vacuum in the blade chambers that is distributed uniformly by the plurality of holes to lift the grass prior to being cut.

These and other features, objects and advantages of the invention will be apparent from the following description of the invention, taken with reference in the accompanying drawings.

DETAILED DESCRIPTION OF THE INVENTION

Figure 1:
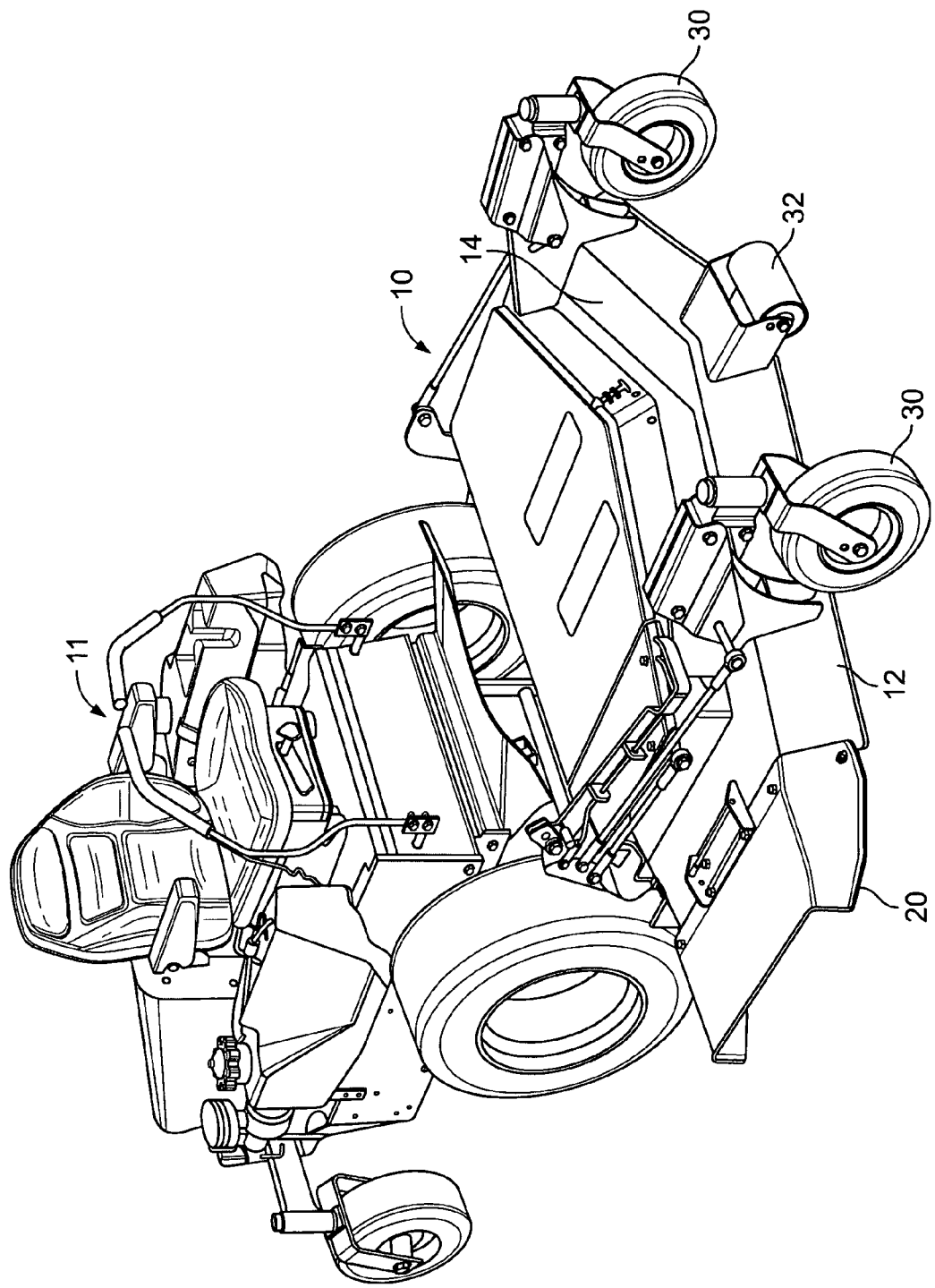
FIG. 1 is a perspective view of a tractor in combination with a mower attachment system constructed in accordance with the principles of the present invention.

A mower attachment unit is shown generally at 10 in FIGS. 1-4. In FIG. 1, the mower attachment unit is operatively connected to a tractor 11 for use in operating and moving the mower attachment unit 10. The mower attachment unit 10 comprises an attachment housing 12 including an upper surface 14, as well as a front baffle 16 and a rear baffle 18. The front baffle 16 and the rear baffle 18 can either be formed as one piece with the upper surface 14 or can be formed as separate components that are coupled to the upper surface 14 by a plurality of fasteners. Additionally, it is possible for the front baffle 16 and the rear baffle 18 to be formed as a single piece. A discharge chute 20 is located on one side of the attachment housing 12. When the mower attachment unit 10 is in use, grass clippings that have already been cut are expelled through the discharge chute 20.

The front baffle 16 and the rear baffle 18 combine to define a plurality of blade chambers 22 therebetween. In a preferred embodiment of the invention, the mower attachment unit 10 includes three blade chambers 22. Each blade chamber 22 includes a blade assembly 24 therein, with each blade assembly 24 comprising a cutting blade 26 that is rotatably mounted on a spindle 28. The spindle 28 is operatively connected to the upper surface 14 of the attachment housing 12. In a preferred embodiment of the invention, each cutting blade 26 extends substantially to the outer edge of each blade chamber 22.

As shown in FIG. 1, the mower attachment unit 10 also includes a plurality of wheels 30 and at least one roller 32 to aid in the directional control and stability of the mower attachment unit 10 when in use. The mower attachment unit 10 also includes an attachment mechanism 34 for coupling the mower attachment unit 10 to the tractor 11 or other vehicle for use in operating the mower attachment unit 10.

Figure 2:
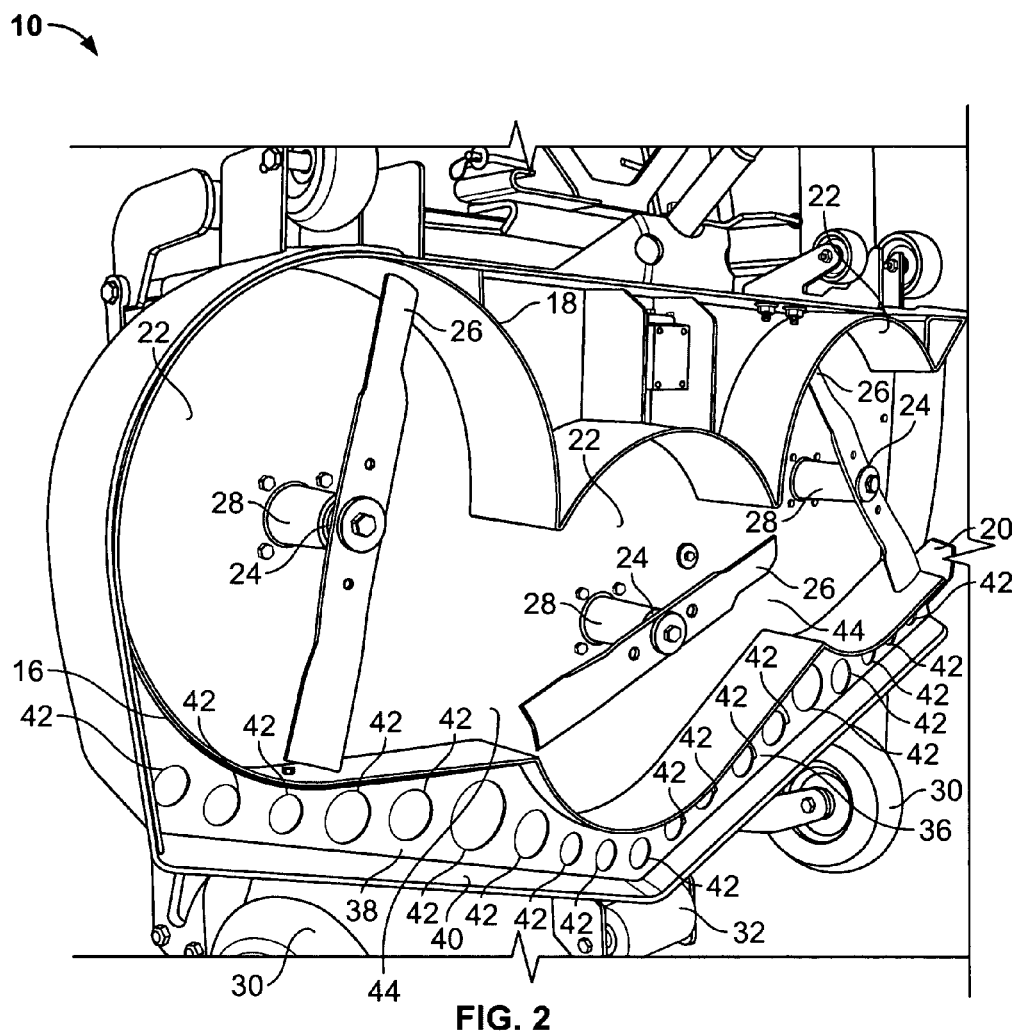
FIG. 2 is a perspective view of the underside of a mowing attachment system constructed in accordance with one embodiment of the present invention.
Figure 3:
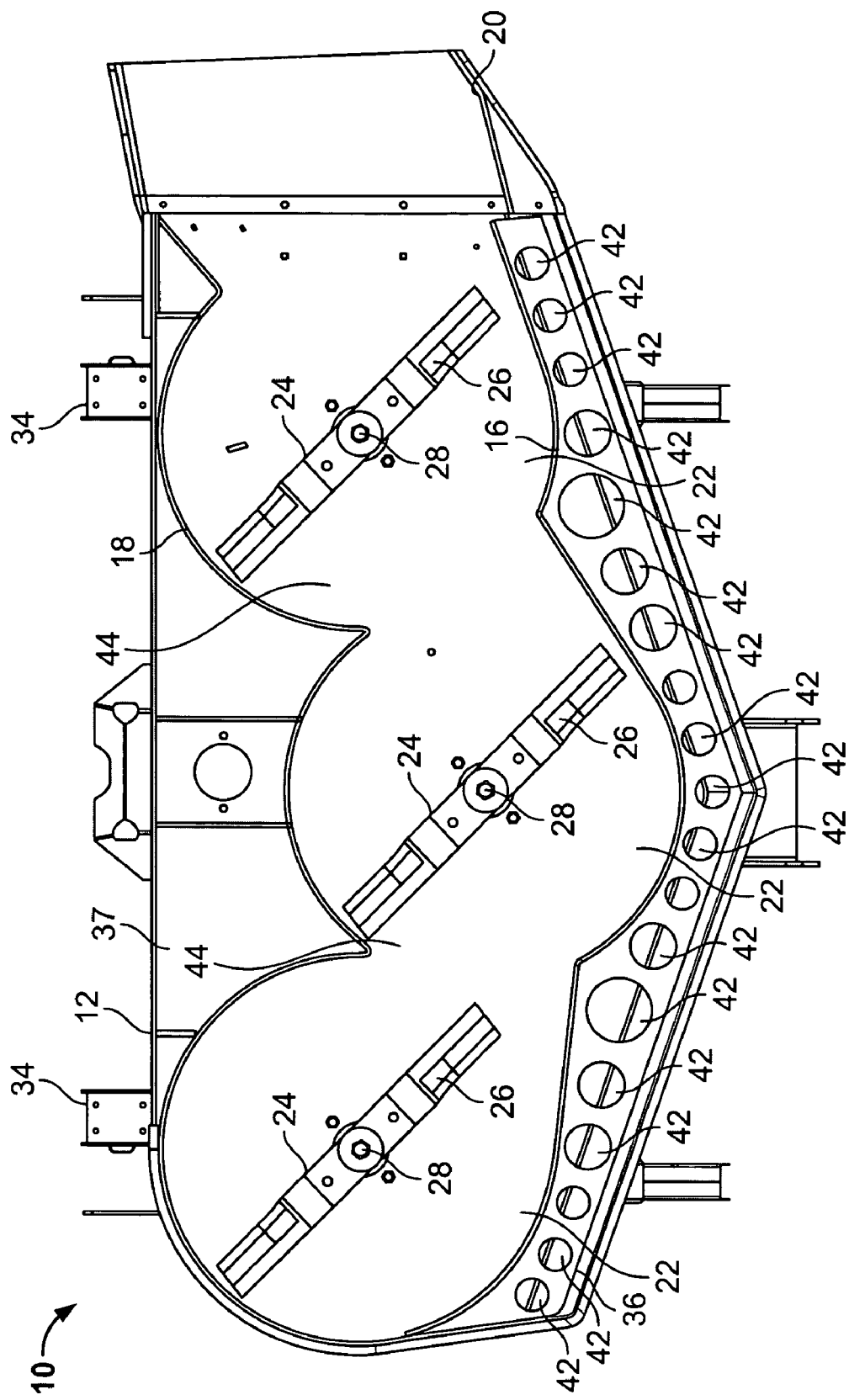
FIG. 3 is a bottom view of the mowing attachment system of FIG. 2.
Figure 4:
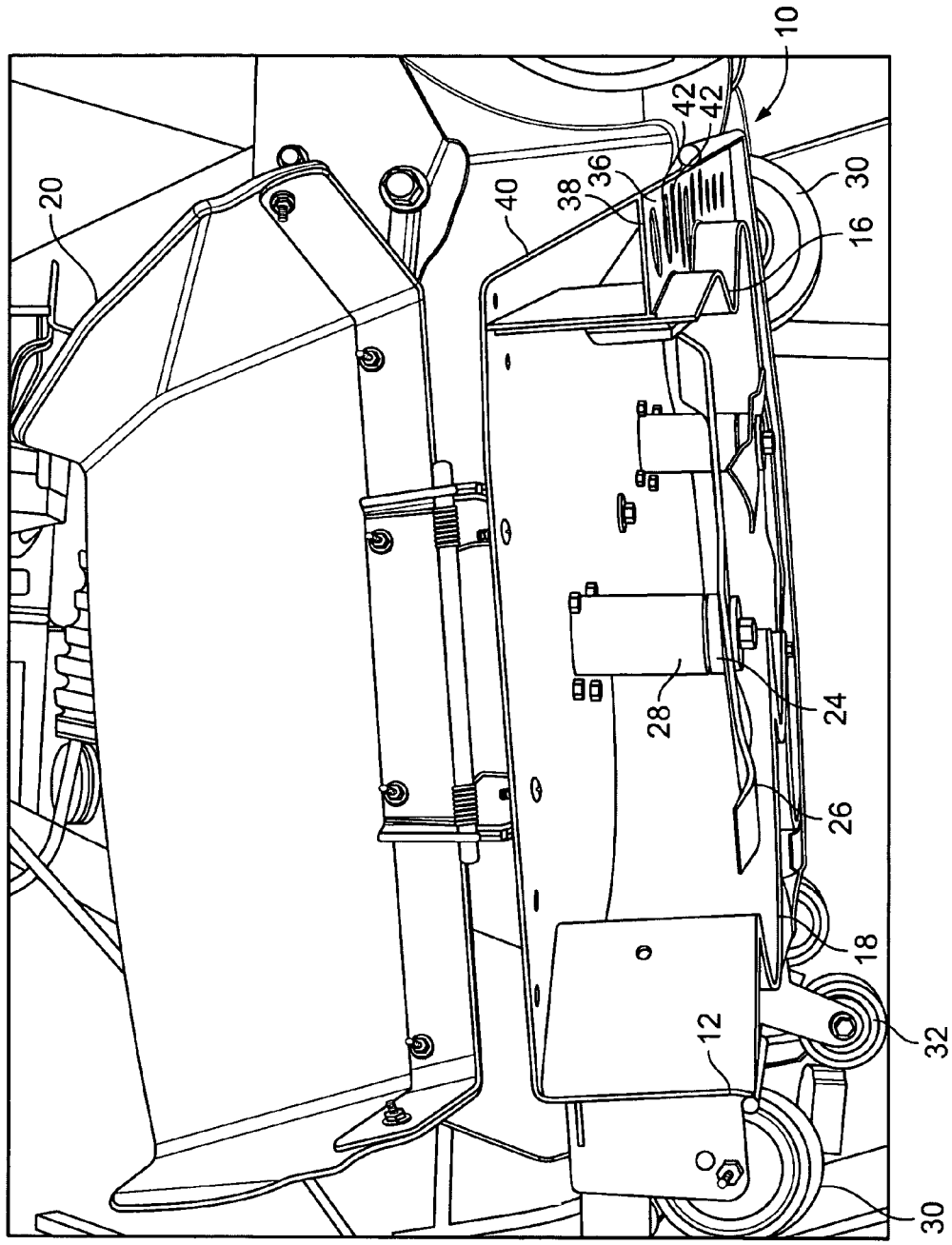
FIG. 4 is a side view of the mower attachment system of FIG. 2.

As shown in FIGS. 2-4, the mower attachment unit 10 also includes a leading plate 36 operatively connected to the front of the front baffle 16. The leading plate 36 can either be formed as a single piece with the front baffle 16 or can be formed as a separate component. The leading plate 36, in a preferred embodiment of the invention, includes a planar surface 38 which preferably runs substantially parallel to the ground and substantially perpendicular to the front baffle 16. In a preferred embodiment of the invention, the leading plate 36 is substantially "V" shaped. The leading plate 36 can also include a short longitudinal surface 40 intersecting the planar surface 38. The mower attachment unit 10 may also include a trailing plate 37 operatively connected to the rear baffle 18. In a preferred embodiment of the invention, the upper surface 14 extends over and beyond the leading plate 36, coupling to the front of the leading plate 36 and substantially hiding the leading plate 36 from view.

As is clearly shown in FIGS. 2-4, the leading plate 36 includes a plurality of apertures 42 positioned therein to aid in the direction the flow of air into the mower attachment unit 10. It has been observed that the presence in the plurality of apertures 42 in the leading plate 36 aids in more efficiently directing the flow of air through the mower attachment unit 10 and out through the discharge chute 20 than conventional systems.

The plurality of apertures 42, in one preferred embodiment of the invention, are circular in shape. However, other shapes may also be used for the apertures 42. As is shown in FIGS. 2-4 and in a preferred embodiment of the invention, the plurality of apertures 42 do not have a uniform size. Instead, some of the apertures 42 have a larger diameter than others. It has been observed that having apertures 42 of different sizes can aid in maximizing the efficiency of the air flow into and through the mower attachment unit 10. For example, for the mower attachment unit 10 in FIGS. 2-4, the blade chambers 22 intersect each other in two locations, which are referred to as joining regions 44. In the preferred embodiment of the invention shown in FIGS. 2-4, those apertures 42 that are closest to the joining regions 44 have the largest diameters, while the apertures 42 progressively have smaller diameters the farther away they are from the respective joining regions 44. This particular embodiment aids in the flow of air through the mower attachment unit 10 while minimizing blow out.

Figure 5:
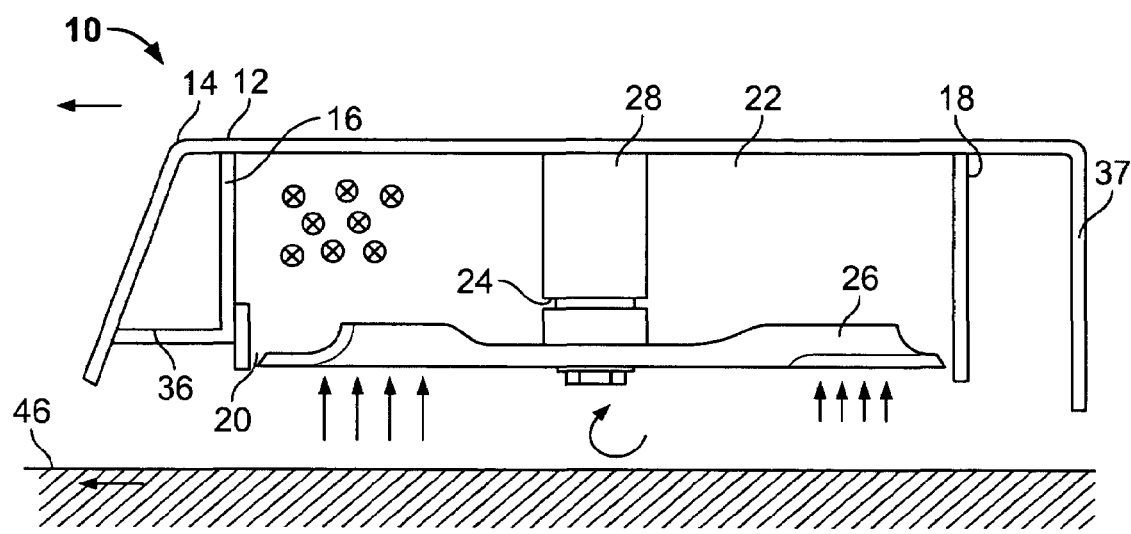
FIG. 5 is a sectional side view of the mower attachment system of FIG. 2, showing the movement of air through the system.

FIG. 5 shows the flow of air through one blade chamber 22 during the cutting process. As the blade chamber 22 moves forward relative to the ground 46, air flows into the blade chamber 22, as a result of the spinning cutting blade 26, air is pushed upward towards the upper surface 14. Once the grass has been cut, grass clippings are pushed upward and eventually out the discharge chute 20. The leading plate 36 and the plurality of apertures 42 aid in directing the flow of air into the region below the cutting blade 26 increasing the efficiency of the air flow, as well as improving the cut of grass.

While various embodiments have been shown and described herein, the invention is not limited to these particular embodiments. For example, the planar surface 38 of the leading plate 36 can be at varying heights above the ground 46, and the plurality of apertures 42 can be of varying shape, sizes and arrangements, on the leading plate 36. Additionally, the system of the present invention can either be used as a separate attachment unit, or as part of a single mowing device included with the vehicle 50. It is also possible to include varying numbers of cutting blades 26, as well as possibly including multiple cutting blades 26 in one blade chamber 22. Accordingly, the scope of the invention is not intended to be limited by the description and drawings herein.

What is claimed is:

1. A mower unit for cutting material on a surface, comprising:
   a housing including a discharge chute defined therein for discharging material;
   a plurality of blade assemblies operatively connected to the housing for rotation about an axis substantially perpendicular to the ground;
   a front baffle operatively connected to the underside of an upper surface of the housing, the front baffle having a rear face exposed to the plurality of blade assemblies and a front face on an opposite side of the front baffle from the rear face;
   a rear baffle operatively connected to the underside of the upper surface of the housing, the front baffle and the rear baffle cooperating to define a plurality of blade chambers within which the plurality of blade assemblies are positioned; and
   a leading plate positioned within the housing, displaced below the upper surface, and operatively connected to the front face of the front baffle and extending away from the plurality of blade chambers, the leading plate including a plurality of apertures on a top side thereof.

2. The mower unit of claim 1, further comprising a rear plate operatively connected to the rear baffle.

3. The mower unit of claim 1, wherein the plurality of blade chambers comprise three blade chambers, and wherein the plurality of blade assemblies comprise three blade assemblies.

4. The mower unit of claim 1, wherein each of the plurality of blade assemblies comprises:
   a spindle assembly coupled to the housing; and
   a cutting blade rotatably connected to the spindle assembly, each cutting blade extending substantially to the edge of its respective blade chamber.

5. The mower unit of claim 1, wherein the plurality of apertures are circular in shape.

6. The mower unit of claim 5, wherein the plurality of apertures have varying diameters to optimize air flow towards the discharge chute.

7. The mower unit of claim 1, wherein the plurality of blade chambers define joining regions in areas where at least one of the plurality of blade chambers intersects with another of the plurality of blade chambers.

8. The mower unit of claim 7, wherein those apertures that are closer to the joining regions are larger than those apertures that are away from the joining regions.

9. A mower attachment, comprising:
   an attachment housing including an upper surface and front and rear baffles extending downwardly from the upper surface, the front and rear baffles shaped to define a plurality of blade chambers therebetween;
   a plurality of blade assemblies positioned within the plurality of blade chambers, each of the plurality of blade assemblies including a spindle assembly coupled to the upper surface and a cutting blade rotatably connected to the spindle assembly; and
   a leading plate operatively connected to the front baffle and extending away from the plurality of blade chambers, the leading plate positioned below the upper surface of the housing, within the interior of the housing, and including a plurality of apertures on a top side thereof.

10. The mower attachment of claim 9, wherein the attachment housing includes a discharge chute defined therein.

11. The mower attachment of claim 10, wherein the plurality of blade assemblies comprises three blade assemblies arranged substantially in a "V" shape.

12. The mower attachment of claim 11, wherein the leading plate is substantially "V" shaped.

13. The mower attachment of claim 10, wherein the plurality of apertures are substantially circular in shape and have varying diameters to optimize air flow towards the discharge chute.

14. The mower attachment of claim 9, wherein the plurality of blade chambers define joining regions in areas where at least one of the plurality of blade chambers intersects with another of the plurality of blade chambers.

15. The mower attachment of claim 14, wherein those apertures that are closer to the joining regions are larger than those apertures that are away from the joining regions.

16. A mower system, comprising:
a vehicle; and
a mower attachment coupled to the vehicle, the mower attachment comprising:
an attachment housing including an upper surface, front and rear baffles extending downwardly from the upper surface, the front and rear baffles shaped to define a plurality of blade chambers therebetween, and a discharge chute for dispelling cut material from the attachment housing;
a plurality of blade assemblies positioned within the plurality of blade chambers, each of the plurality of blade assemblies including a spindle assembly coupled to the upper surface and a cutting blade rotatably connected to the spindle assembly; and
a leading plate operatively connected to the front baffle and extending away from the plurality of blade chambers, the leading plate positioned below the upper surface of the housing, within the interior of the housing, and including a plurality of apertures therein.

17. The mower system of claim 16, wherein the mower attachment is removably coupled to the vehicle.

18. The mower system of claim 16, wherein the leading plate is substantially "V" shaped.

19. The mower system of claim 16, wherein the plurality of apertures are substantially circular in shape and have varying diameters to optimize air flow towards the discharge chute.

20. The mower system of claim 19, wherein the plurality of blade chambers define joining regions in areas where at least one of the plurality of blade chambers intersects with another of the plurality of blade chambers, and wherein those apertures that are closer to the joining regions are larger than those apertures that are away from the joining regions.

21. A mower system, comprising:
a vehicle; and
a mower attachment coupled to the vehicle, the mower attachment comprising:
a housing including a discharge chute defined therein for discharging material;
a plurality of blade assemblies operatively connected to the housing for rotation about an axis substantially perpendicular to the ground;
a front baffle operatively connected to the underside of an upper surface of the housing, the front baffle having a rear face exposed to the plurality of blade assemblies and a front face on an opposite side of the front baffle from the rear face;
a rear baffle operatively connected to the underside of the upper surface of the housing, the front baffle and the rear baffle cooperating to define a plurality of blade chambers within which the plurality of blade assemblies are positioned; and
a leading plate positioned within the housing, displaced below the upper surface, and operatively connected to the front face of the front baffle and extending away from the plurality of blade chambers, the leading plate including a plurality of apertures on a top side thereof.

22. A mower unit for cutting material on a surface, comprising:
a housing including a discharge chute defined therein for discharging material;
a plurality of blade assemblies operatively connected to the housing for rotation about an axis substantially perpendicular to the ground;
a front baffle operatively connected to the underside of the housing, the front baffle having a rear face exposed to the plurality of blade assemblies and a front face on an opposite side of the front baffle from the rear face;
a rear baffle operatively connected to the underside of the housing, the front baffle and the rear baffle cooperating to define a plurality of blade chambers within which the plurality of blade assemblies are positioned; and
a leading plate operatively connected to the front face of the front baffle and extending away from the plurality of blade chambers, the leading plate including a plurality of apertures on a top side thereof,
wherein the plurality of apertures are of varying size to optimize air flow towards the discharge chute.

23. The mower unit of claim 22, wherein the plurality of blade chambers define joining regions in areas where at least one of the plurality of blade chambers intersects with another of the plurality of blade chambers.

24. The mower unit of claim 23, wherein those apertures that are closer to the joining regions are larger than those apertures that are away from the joining regions.

25. A mower attachment, comprising:
an attachment housing including an upper surface and front and rear baffles extending downwardly from the upper surface, the front and rear baffles shaped to define a plurality of blade chambers therebetween;
a plurality of blade assemblies positioned within the plurality of blade chambers, each of the plurality of blade assemblies including a spindle assembly coupled to the upper surface and a cutting blade rotatably connected to the spindle assembly; and
a leading plate operatively connected to the front baffle and extending away from the plurality of blade chambers, the leading plate positioned lower than the upper surface of the housing and including a plurality of apertures on a top side thereof,
wherein the plurality of apertures are of varying size to optimize air flow towards the discharge chute.

26. The mower attachment of claim 25, wherein the plurality of blade chambers define joining regions in areas where at least one of the plurality of blade chambers intersects with another of the plurality of blade chambers.

27. The mower attachment of claim 26, wherein those apertures that are closer to the joining regions are larger than those apertures that are away from the joining regions.

28. A mower system, comprising:
a vehicle; and
a mower attachment coupled to the vehicle, the mower attachment comprising:
an attachment housing including an upper surface, front and rear baffles extending downwardly from the upper surface, the front and rear baffles shaped to define a plurality of blade chambers therebetween, and a discharge chute for dispelling cut material from the attachment housing;

a plurality of blade assemblies positioned within the plurality of blade chambers, each of the plurality of blade assemblies including a spindle assembly coupled to the upper surface and a cutting blade rotatably connected to the spindle assembly; and a leading plate operatively connected to the front baffle and extending away from the plurality of blade chambers, the leading plate positioned lower than the upper surface of the housing and including a plurality of apertures therein, wherein the plurality of apertures are of varying size to optimize air flow towards the discharge chute.

29. The mower system of claim 28, wherein the plurality of blade chambers define joining regions in areas where at least one of the plurality of blade chambers intersects with another of the plurality of blade chambers, and wherein those apertures that are closer to the joining regions are larger than those apertures that are away from the joining regions.

* * * * *